(12) United States Patent
Morejon et al.

(10) Patent No.: US 7,406,125 B2
(45) Date of Patent: Jul. 29, 2008

(54) METHOD FOR INITIALIZATION OF PER TONE FREQUENCY DOMAIN EQUALIZER (FEQ) THROUGH NOISE REDUCTION FOR MULTI-TONE BASED MODEMS

(75) Inventors: Israel Morejon, Tampa, FL (US); Yueping Zeng, Lutz, FL (US); Jwalant Dholakia, Tampa, FL (US)

(73) Assignee: Jabil Circuit, Inc., St. Petersburg, FL (US)

( * ) Notice: Subject to any disclaimer, the term of this patent is extended or adjusted under 35 U.S.C. 154(b) by 664 days.

(21) Appl. No.: 10/821,794

(22) Filed: Apr. 9, 2004

(65) Prior Publication Data

US 2004/0264587 A1 Dec. 30, 2004

Related U.S. Application Data

(60) Provisional application No. 60/461,604, filed on Apr. 9, 2003.

(51) Int. Cl.
*H04B 1/66* (2006.01)
*H04N 11/02* (2006.01)
*H03K 5/159* (2006.01)
*H04L 27/01* (2006.01)

(52) U.S. Cl. .................. 375/240.29; 375/229; 375/316; 375/240; 375/232

(58) Field of Classification Search ......... 375/229–236, 375/240, 240.02–240.07, 240.26–240.29, 375/316, 346–350, 343
See application file for complete search history.

(56) References Cited

U.S. PATENT DOCUMENTS 6,320,901 B1 11/2001 Arad et al.
6,353,629 B1 3/2002 Pal
6,359,933 B1 3/2002 Aslanis et al.

(Continued)

FOREIGN PATENT DOCUMENTS

EP 967763 A1 * 12/1999

(Continued)

OTHER PUBLICATIONS

Van Acker et al, Per tone Equalization for DMT-Based Systems, Jan. 2001, IEE Transactions on Communications, vol. 49, No. 1, pp. 109-119.*

(Continued)

*Primary Examiner*—David C. Payne
*Assistant Examiner*—Linda Wong
(74) *Attorney, Agent, or Firm*—King & Spalding LLP

(57) ABSTRACT

An improved per-tone FEQ method with a noise reduction technique using periodic training pilot tones increases the throughput for long-reached modems. This method can reduce the noise effects in estimating FEQ equalizer coefficients. Each per-tone FEQ can be estimated by using the periodic training signals and an averaging technique to remove noise from each sub-channel (EQN. VI). After solving the system equations (EQN. IV), per-tone equalization coefficients of the FEQ equalizer for each group can be combined to obtain the optimized results in the form of the Toeplitz matrix (EQN. V). Each element within the Toeplitz matrix can be derived from the averaging technique used to remove noise from each sub-channel (EQN. VI). To demodulate a signal with the Toeplitz matrix, an inverse of every element in a row of the Toeplitz matrix is taken and multiplied by the sending signal which creates an N Log N matrix.

14 Claims, 9 Drawing Sheets

U.S. PATENT DOCUMENTS

| | | | |
|---|---|---|---|
| 6,456,654 | B1 | 9/2002 | Ginesi et al. |
| 6,546,056 | B1 | 4/2003 | Rosenlof |
| 6,735,255 | B1* | 5/2004 | Smart et al. ............... 375/260 |
| 6,744,821 | B1 | 6/2004 | Van Acker et al. |
| 7,106,789 | B1* | 9/2006 | Rezvani ..................... 375/222 |
| 2003/0152156 | A1 | 8/2003 | Cuypers et al. |
| 2003/0195913 | A1* | 10/2003 | Murphy ..................... 708/620 |
| 2004/0042543 | A1 | 3/2004 | Li et al. |

OTHER PUBLICATIONS

Van Acker et al, Per tone Equalization for DMT-Based Systems, Jan. 2001, IEE Transactions on Communications, vol. 49, No. 1, pp. 109-119.*

Giovanni Cherubini, Evangelos Eleftherious and Sedat Olcer, "Filtered Multitone modulation for very high-speed digital subscriber line," *IEEE Journal on selected areas in communications*, vol. 20, No. 5, pp. 1016-1028, Jun. 2002.

J. Cioffi, G. Cherubini, E. Eleftherious and Sedat Olcer, "Construction of modulated signals from filter-bank elements, " *TIEI*. 4/99-, Jun. 1999, pp. 1-6.

Bojan Vrcelj and P.P. Vaidyanathan, "Pre- and Post-Processing for Optimal Noise Reduction in Cyclic Prefix Based Channel Equalizers," 2002, 5-pgs.

K.V. Acker, G. Leus, M. Moonen, O. Wiel, and T. Pollet, "Per tone equalization for DMT-Based systems," *IEEE Trans. Commun.*, vol. 49, No. 1, Jan. 2001, pp. 109-119.

Bingham, John A. C., *ADSL, VDSL, and Multicarrier Modulation*, 2002, Wiley: New York, pp. 66 and 250.

* cited by examiner

| LOOP LENGTH (KM) | PTE (Mb/s) | UEC (Mb/s) | TEQ-FB (Mb/s) | MMSE (Mb/s) | MAX SNR (Mb/s) | MAX BR (Mb/s) |
|---|---|---|---|---|---|---|
| 1 | 22.22 | 12.37 | 16.84 | 18.71 | 16.55 | 19.49 |
| 2 | 17.55 | 8.465 | 15.81 | 14.59 | 14.69 | 15.13 |
| 3 | 13.03 | 5.153 | 11.85 | 10.29 | 11.00 | 11.31 |
| 4 | 8.162 | 4.974 | 7.368 | 7.701 | 6.931 | 7.011 |
| 5 | 4.412 | 2.648 | 3.791 | 3.981 | 3.568 | 3.685 |
| 6 | 2.492 | 0.982 | 2.003 | 1.989 | 1.962 | 1.991 |
| 7 | 1.616 | 0.382 | 1.142 | 1.034 | 1.192 | 1.217 |
| 8 | 1.200 | 0.270 | 0.714 | 0.494 | 0.649 | 0.825 |

FIG 3

| NUMBER OF FRAMES | DATA RATE (8km) |
|---|---|
| 1 FRAME | 0.93 |
| 5 FRAMES | 1.11 |
| 10 FRAMES | 1.16 |
| 50 FRAMES | 1.18 |
| 100 FRAMES | 1.20 |

FIG 5

| LOOP LENGTH (KM) | LOOP LENGTH (Kft) | LOOP LENGTH (Mile) | PTE (100 frames) (Mb/s) | PTE (1 frames) (Mb/s) | PTE (1 tap) (Mb/s) |
|---|---|---|---|---|---|
| 1 | 3.28 | 0.6 | 22.22 | 21.27 | 70.44 |
| 2 | 6.56 | 1.2 | 17.55 | 16.60 | 20.06 |
| 3 | 9.84 | 1.8 | 13.03 | 12.08 | 8.066 |
| 4 | 13.1 | 2.4 | 8.162 | 7.261 | 3.390 |
| 5 | 16.4 | 3.1 | 4.412 | 3.757 | 1.691 |
| 6 | 19.6 | 3.7 | 2.492 | 2.095 | 0.980 |
| 7 | 22.9 | 4.3 | 1.616 | 1.327 | 0.458 |
| 8 | 26.2 | 4.9 | 1.200 | 0.893 | 0.332 |

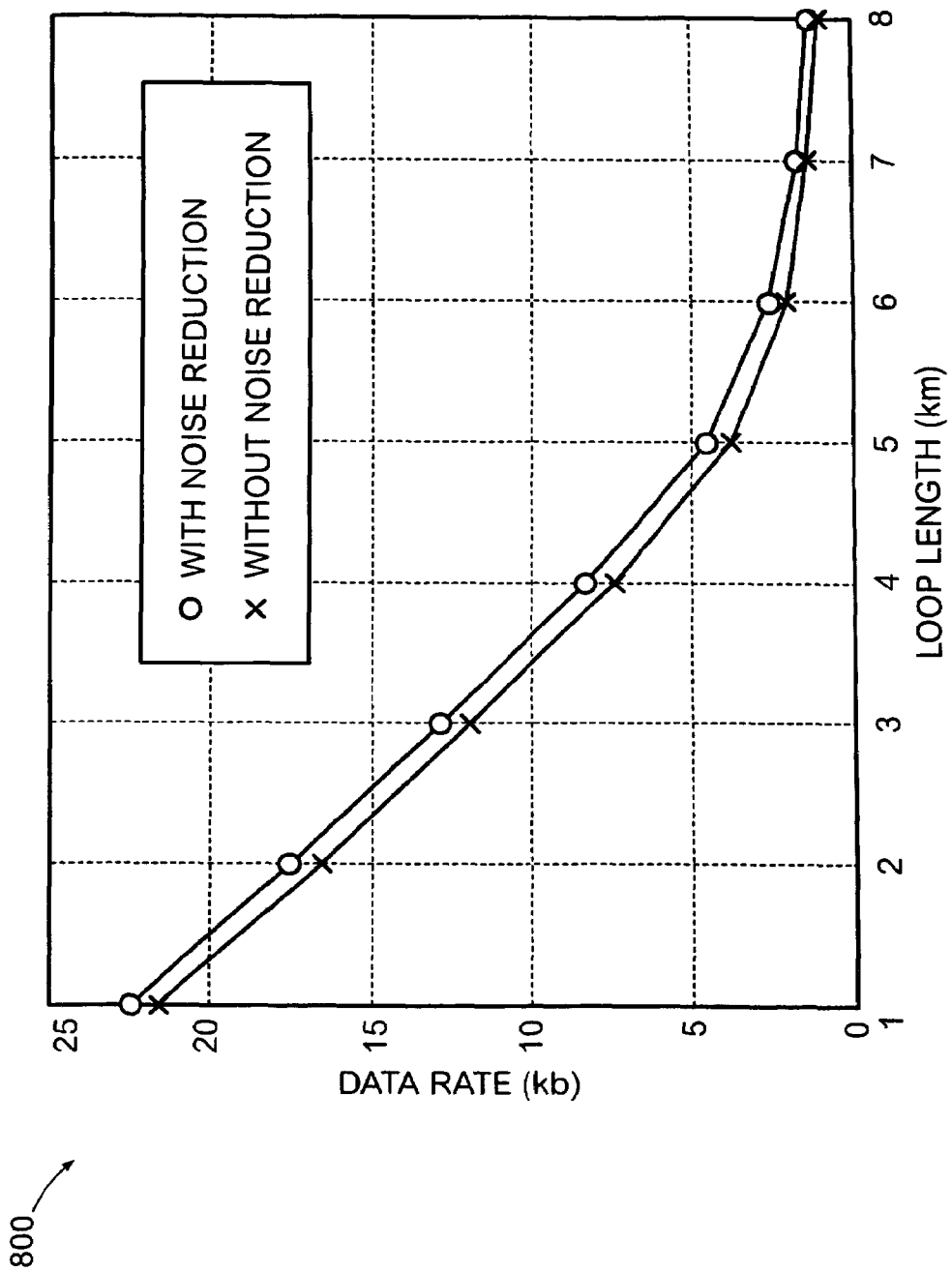

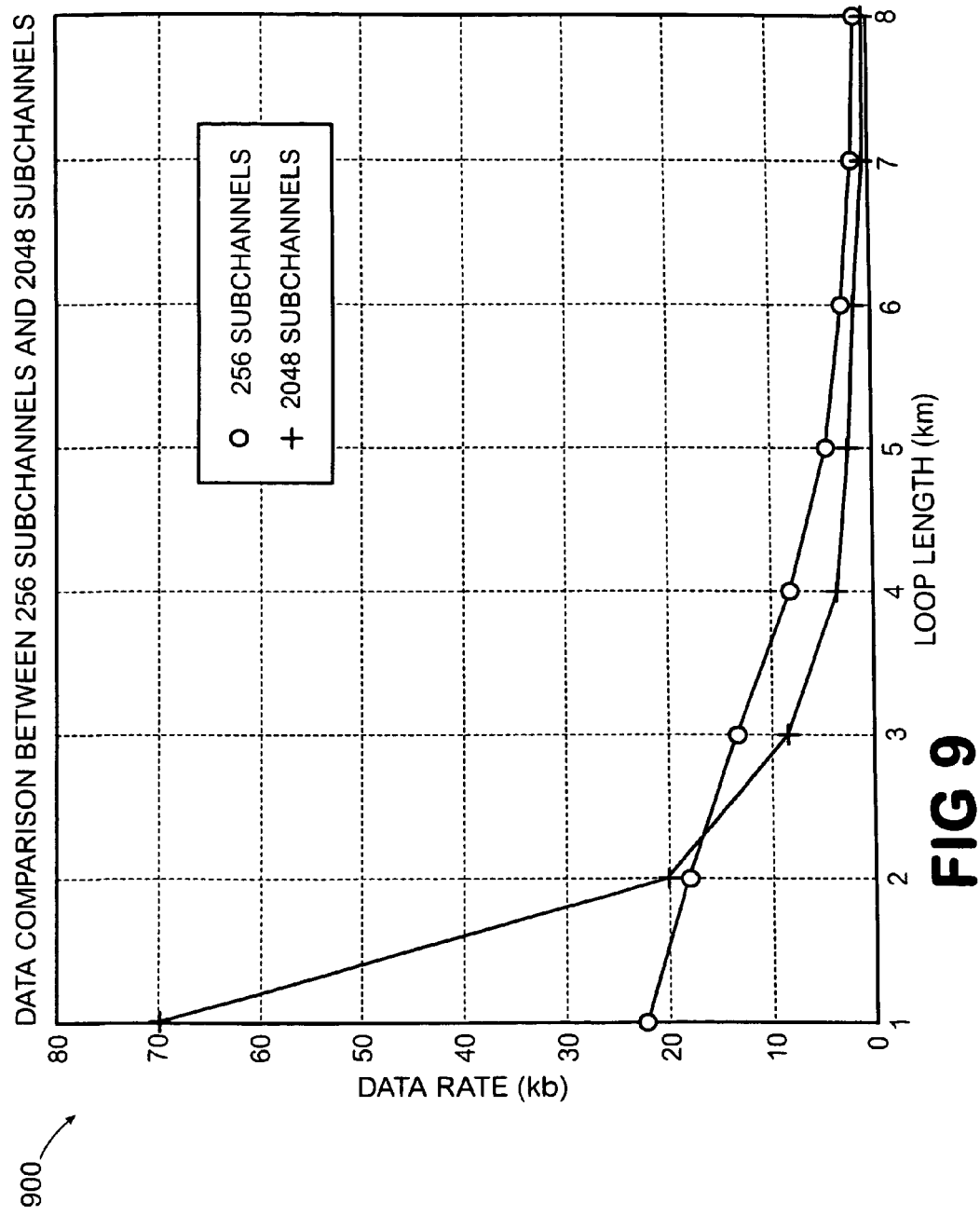

METHOD FOR INITIALIZATION OF PER TONE FREQUENCY DOMAIN EQUALIZER (FEQ) THROUGH NOISE REDUCTION FOR MULTI-TONE BASED MODEMS

STATEMENT REGARDING RELATED APPLICATIONS

The present application claims priority to provisional patent application entitled, "Method for Initialization of Per Tone FEQ through Noise Reduction for Multi-tone based Modems," filed on Apr. 9, 2003 and assigned U.S. Application Ser. No. 60/461,604, the entire contents of which are hereby incorporated by reference. This application is also related to copending and commonly owned U.S. application Ser. No. 10/065,635, filed on Nov. 5, 2002, entitled, "Discrete Multitone Modem Initialization System and Method," the entire contents of which are hereby incorporated by reference. This application is also related to commonly owned and copending U.S. application Ser. No. 10/605,933, filed on Mar. 4, 2004, and entitled, "Method and Apparatus for Noise Reduction by Spectral and Subcarrier Averaging," the entire contents of which are hereby incorporated by reference.

FIELD OF INVENTION

One exemplary embodiment of the present invention relates to the field of digital communications. More specifically, this invention provides a system for estimating per-tone Frequency domain EQualizer (FEQ) tap weights through noise reduction that results in increased throughput for long-reach modems.

BACKGROUND OF INVENTION

In modem telecommunications, unshielded twisted pairs (UTP) are used on a massive scale. The lower price of this transmission system and already established infrastructure currently are the main advantages of phone lines over optical lines. In comparison with single carrier modulation, the benefits of multicarrier modulation (MCM) can be explained as that the capacity of a MCM for a band limited system is always greater than the capacity of a single carrier system if channel SNR is not constant. Among MCM systems for wired communications, only Discrete Multitone (DMT) is currently deployed. Another MCM technique of interest is Filtered Multitone (FMT) system but will not be discussed further.

DMT modulation has become an important transmission method for asymmetric digital subscriber lines (ADSLs) which provides a high bit rate downstream channel and a lower bit rate upstream channel over twisted pair copper wire. DMT divides the available bandwidth into parallel subchannels or tones. Bits and power are allocated to individual subchannels or tones of an Inverse Fast Fourier Transform (IFFT)/Fast Fourier Transform (FFT) to maximize the data rate for a fixed margin or to maximize the margin for a fixed data rate. The process of allocating bits and power to individual subchannels is referred to as bit loading.

In other words, an incoming serial bitstream is divided into parallel streams which are used to Quadrature Amplitude Modulation (QAM)-modulate the different tones. After modulation with an IFFT, a cyclic prefix is added to each symbol being transmitted. The use of a cyclic prefix (prepending the tail of a signal after the IFFT to the block to be transmitted) allows for simplified equalization at the receiver with equalizers if the channel memory is not larger than the length of the cyclic prefix. In this case, equalization simply reduces to multiplication by a complex number on a subchannel by subchannel basis to remove the effects of the channel. Effects of the channel which can distort a communications signal can include, but are not limited to, noise in general, signal loss or attenuation, and phase noise. A channel can include, but is not limited to, a twisted wire pair, a coaxial cable, a bundle of cables, optical waveguides, and wireless mediums such as RF communications in the form of over-the-air transmissions and satellite transmissions.

Equalization that includes multiplication by a complex number on a subchannel by subchannel basis can be achieved with a combination of an IFFT, channel, and FFT that results in a diagonal matrix relating to the input block of data that is transmitted to the received block of data, with the channel response as the elements of the diagonal. In other words, if the cyclic prefix is longer than the channel impulse response, demodulation of a signal can be implemented with a FFT, followed by a complex 1-Tap Frequency Domain Equalizer (FEQ) per tone to compensate for the channel amplitude and phase effects.

Equalizers are devices generally used in receivers to compensate for the effects on a channel that can be established between a receiver and a transmitter. Equalizers compensate for these effects mathematically. Equalizers can operate in the time domain or in the frequency domain. Time domain equalizers (TEQs) can shorten the impulse response of a channel and they can partially bandpass an incoming signal as well as filter out-of-band noise power. TEQs are generally adaptive in nature and its coefficients are usually trained during initialization. On the other hand, FEQs can compensate amplitude attenuation and phase shift in frequency domain of received signals due to the effect of a band-limited channel.

A long cyclic prefix, however, results in a large overhead with respect to data rate. A conventional solution for this problem is to insert a real T-tap time-domain equalizer (TEQ) before demodulation, to shorten the channel impulse response. Imperfectly shortened channel impulse responses can yield to intersymbol interference (ISI) between two successive symbols and intercarrier interference (ISI) between different carriers.

Conventional algorithms have been developed to initialize the TEQ. The TEQ-initialization can compute a TEQ such that a cascade of channel impulse response and TEQ forms a finite impulse response (FIR) channel with a length shorter than the cyclic prefix. This criterion leads to use of a minimum mean square error (MMSE) technique for demodulation. Further details of MSME techniques and DMT are generally described in a printed publication, "Per Tone Equalization for DMT-Based Systems," authored by Van Acker et al. for the IEE Transactions on Communications, Volume 49, No. 1, Jan. 2001, the entire contents of which are hereby incorporated by reference.

Back to MCM systems in general, many conventional MCM systems operating on long loops have very limited data throughput. The data throughput is limited by severe attenuation and thermal noise even when water-filling algorithms are used. For long loops beyond 18 Kft Far End Crosstalk (FEXT) is the only significant crosstalk and the total "noise" is dominated by Additive White Gaussian Noise (AWGN), which is typically −140 dBm/Hz. Reducing the thermal noise, accurately estimating the equalizer to cancel the channel distortion, and increasing the throughput for these long loops are severe challenges.

To increase the data rate for a long-reach modem, one of the major problems is using ISI cancellation. By using the averaging techniques for the noise reduction, ISI cancellation can be accomplished. Further, in order to estimate the equalization coefficients accurately, thermal noise should be removed from the training signal. One of the methods to combat ISI is the MMSE equalization, which is based on the minimization of a cost function. In MMSE, although the equalizer coefficients are calculated to minimize the MMSE error, the accuracy of the equalizer is still compromised due to thermal noise. As the length of the channel increases, the system matrix may become ill conditioned. The inversion of a system matrix can become mathematically intricate and additionally if the matrix has nulls, it becomes non-invertible. Various MMSE equalizers based on similar schemes with different constrains suffer from the same problems.

In view of the foregoing, there is a need in the art for initializing a modem in a mathematically less complex or more simple manner and in a shorter period of time. There is also a need in the art for increasing the data rate for long distance reach over existing telephone lines.

SUMMARY OF INVENTION

The longstanding but heretofore unfulfilled need to accurately calculate per-tone FEQs tap values and increase data rate for long distance reach over the existing telephone lines can be achieved with one exemplary embodiment of the present invention. One exemplary embodiment of the present invention can be implemented for a modem or any communication system. Moreover, this scheme can be utilized to reduce random noise for any signal transmission system.

In this invention, a new method to create system equations is proposed. This method can reduce the noise effects in the process of estimating FEQ equalizer coefficients. Equalizers are devices generally used in receivers to compensate for the effects on a channel that can be established between a receiver and a transmitter. Equalizers compensate for these effects mathematically. These "effects" can include, but are not limited to, noise in general, signal loss or attenuation, and phase noise. A channel can include, but is not limited to, a twisted wire pair, a coaxial cable, a bundle of cables, optical waveguides, and wireless mediums such as RF communications in the form of over-the-air transmissions and satellite transmissions.

Periodic training signals can be transmitted and a Toeplitz matrix can be generated using the training signals transmitted over a channel. Moreover, the received signals can be appropriately grouped and averaged to reduce any effective thermal noise. Specifically, according to one exemplary aspect, an averaging technique can be used to remove noise from each subchannel (See EQN. VI). According to another exemplary aspect, noise can be removed from calculated tap values by taking an average of frames of data that are received (See EQN. IX described below).

Prior to taking an average of frames of data, the FEQ equalizer coefficients or tap values can be calculated for each tone according to the group of subchannels by solving the system equations (EQN. IV). Each per-tone FEQ can be estimated by using the periodic training signals and an averaging technique to remove noise from each sub-channel (EQN. VI). After solving the system equations (EQN. IV), the per-tone equalization coefficients of the FEQ equalizer for each group can be combined to obtain the optimized results in the form of the Toeplitz matrix (EQN. V). Each element within the Toeplitz matrix can be derived from the averaging technique used to remove noise from each sub-channel (EQN. VI).

To demodulate a signal with the Toeplitz matrix, an inverse of every element in a row of the Toeplitz matrix is taken and multiplied by the sending signal which creates an N Log N matrix which can be characterized as having approximately the same complexity of an Fast Fourier Transform (FFT). This N Log N matrix that comprises matrix elements calculated by an averaging technique of the present invention is significantly simpler compared to the $N^3$ ("N cubed") matrix solution of the conventional art. Further, since the periodic training is only carried out during link initialization, overhead can be minimized.

As noted above, this inventive approach can avoid matrix inversion during FEQ equalizer initialization. Matrix inversion is usually required by most conventional MMSE based algorithms. Avoiding matrix inversion can reduce the complexity from an "N cubed" matrix solution ($O(N^3)$) to an N Log N matrix solution ($O(N^2)$) which allows for simpler and faster processing by a digital signal processor.

Selecting per tone equalizer length individually of a FEQ equalizer can further reduce the complexity of calculating tap values and can increase digital signal processing speed. The per tone equalizer length of a FEQ equalizer can be individually optimized by equalizing each row in the Toeplitz matrix through the use of pilot or training signals. In other words, every element of each row of the Toeplitz matrix can be multiplied by the pilot signal. The FEQ equalizer for severely distorted channels can also be suppressed. An advantage of the technique is that the estimation of channels can be avoided during the process of equalizer initialization. Another advantage of the technique compared to a conventional Time Domain Equalizer (TEQ) and 1 tap FEQ is reduced sensitivity to the synchronization.

BRIEF DESCRIPTION OF DRAWINGS

For a fuller understanding of the nature and objects of the invention, reference should be made to the following detailed description, taken in connection with the accompanying drawings, in which:

FIG. 3 is a table of a data rate comparison of different equalizer schemes according to one exemplary embodiment of the present invention.

FIG. 5 is a table of a data rate comparison of a different number of periodic training symbols according to one exemplary embodiment of the present invention.

FIG. 8 is a graph illustrating the data rate comparison illustrated in FIG. 7.

FIG. 9 is a graph illustrating a data rate comparison with 512 and 2048 subchannels according to one exemplary embodiment of the present invention.

DETAILED DESCRIPTION OF EXEMPLARY EMBODIMENTS

Figure 1:
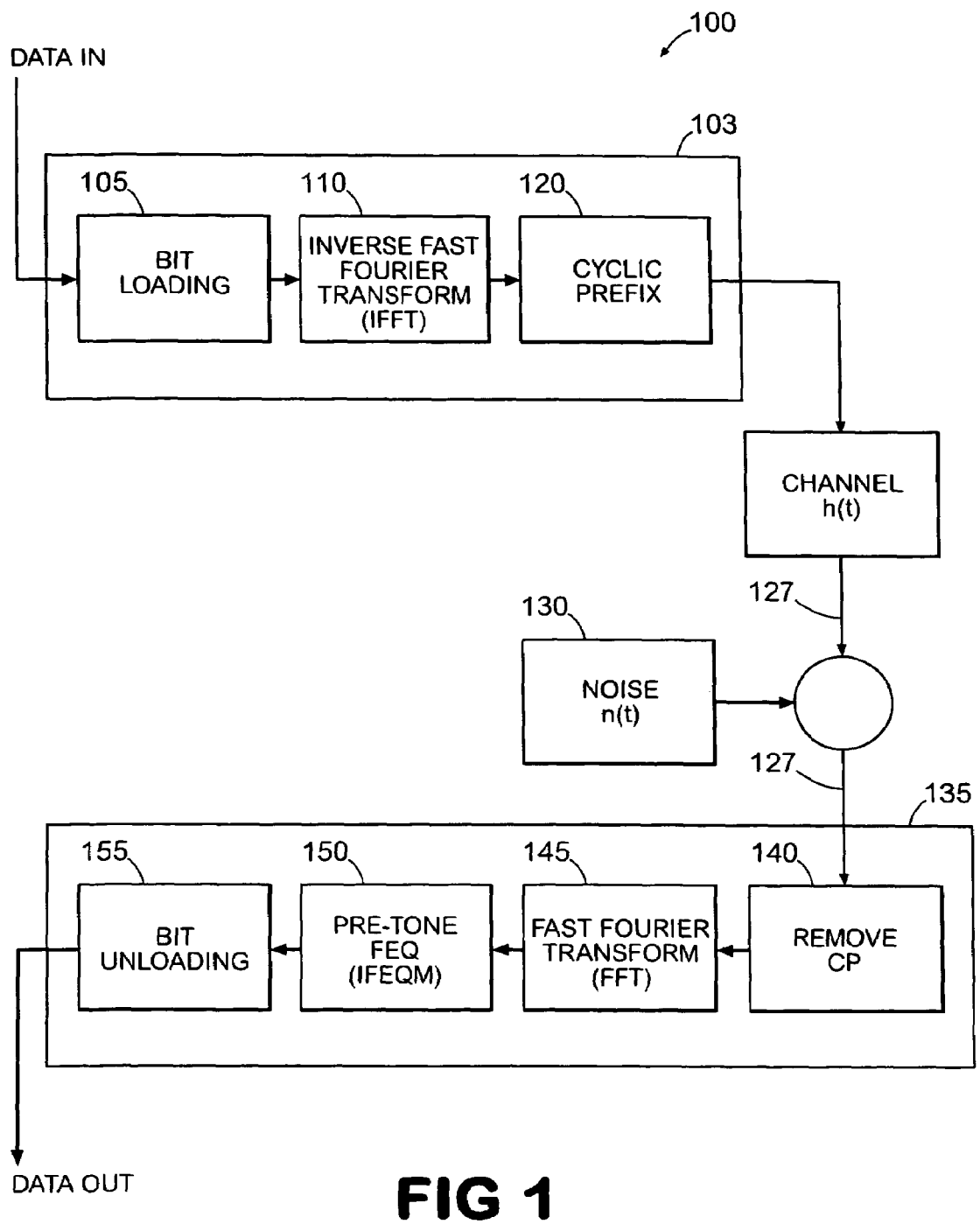
FIG. 1 illustrates a simplified DMT based DSL system with a per tone equalizer according to one exemplary embodiment of the present invention.

Referring now to FIG. 1, this figure illustrates an exemplary discrete multitone (DMT) modulation digital subscriber line (DSL) system 100 with a per tone equalizer. The DSL system 100 can comprise a bit loading element 105, an Inverse Fast Fourier Transform (IFFT) segment 110, and a cyclic prefix block 120.

The input bits are loaded in the bit loading element 105. During the modem start-up, certain carriers are used as pilot tones. Prior to transmission both transmitter 103 and receiver 135 know the data sent over these tones. Pilot tones are helpful for timing information extraction as well as for channel estimation. The bits are then modulated to provide N complex valued symbols, typically Quadrature Amplitude Modulated (QAM) symbols $X(k)$, $0 \leq k \leq N-1$ that modulate N orthogonal sub-carriers using IFFT and generate N samples of time-domain signal $x(n)$. In the DMT implementation, a set of QAM symbols $\underline{X}^m$ is generated by the system.

Due to the conjugate symmetric property of the input data, the discrete output signal $x_n$ will have real-valued samples when the Inverse Fast Fourier transform (IFFT) 110 is performed at the transmitter. Prior to the output signal's transmission into the channel, a cyclic prefix (CP) 120 is inserted at the beginning of the real DMT time symbol to combat Inter-Symbol Interference (ISI) between adjacent symbols. If the length of the cyclic prefix is larger than the length of the equivalent discrete time channel or the channel impulse response (CIR), then ISI can be effectively eliminated.

However, in practical channels the CIR can be equivalent to a large number of samples. When this is the case, synchronization can be severely delayed. To achieve channel partitioning and to avoid inter-symbol interference (ISI), DMT/OFDM extends the modulated transmit vector, the result is that the transmit vector is extended by copying the last samples of the multicarrier symbol at the beginning of the DMT symbol. This is called cyclic prefix (CP) 120. Before transmitting, the converter transforms discrete-time samples of the signal into an analog signal, which is transmitted over the communication medium.

An unshielded twisted pair (UTP) or a coaxial cable 127 can form a channel $h(t)$ 125 which supports a propagated signal. A channel can also include, but is not limited to, a bundle of cables, optical waveguides, and wireless mediums such as RF communications in the form of over-the-air transmissions and satellite transmissions. Noise $n(t)$ 130 can be introduced into the channel $h(t)$ 125. This noise $n(t)$ 130 can be attributed to many different sources. For example, noise $n(t)$ 130 can be generated by crosstalk, and additive white Gaussian noise.

A receiver 135 can comprise a CP removal element 140, a Fast Fourier Transform (FFT) block 145, a per-tone frequency domain equalizer 150, and a bit-unloading element 155. The transmission medium, such as a telephone line channel $h(t)$, can introduce noise (130) in addition to attenuation, distortion and phase rotation to the signal. The received signal with the Channel Impulse Response (CIR) has the noise 130 and attenuation due to channel effects 125. The signal arriving at the receiver 135 can be digitized with an A/D converter (not shown). The cyclic prefix can be removed with the CP removal element 140 and the signal is demodulated using the FFT 145.

Since the transmitter 103 and the receiver 135 do not share the same clock signal, they are not 135 synchronized at the beginning of communication. In order to decode the information properly, the receiver 135 usually must synchronize itself initially with transmitter 103. Receiver synchronization is generally performed in two steps—timing offset estimation and timing offset correction, through symbol clock correction and a delay-rotor property. Essentially, synchronization can align FFT windows of both at the transmitter 103 and the receiver 135.

One exemplary embodiment of the present invention utilizes Maximum Likelihood (ML) estimation to extract timing offset information. Since it is a non-data aided (NDA) method, the receiver 135 side can perform timing estimation before FFT 145. Therefore synchronization can be achieved faster.

According to the method of one exemplary embodiment of the present invention, a DMT frame of length N+LP is transmitted. Let N be the number of samples in a DMT frame, and LP the length of CP. The frame of N+LP samples is received at the receiver 135. Since the CP is generated using last LP samples of total N samples, it yields a maximum correlation when aligned with those last LP samples of the DMT frame.

This property is utilized to estimate the timing offset information at the receiver 135. At the receiver 135, the correlation function is calculated for each value of estimated delay. However, in the presence of severe interference and/or low Signal to Noise Ratio (SNR), a large number of frames are required to extract optimal timing information.

The final result is a longer start-up phase for the modem or receiver 135. Therefore, rather than using just LP samples for the calculation of Maximum Likelihood (ML), one exemplary embodiment of the present invention uses the whole received DMT frame of N+LP samples to correlate with a pre-stored frame of the same size at the receiver 135. With the same accuracy compared to conventional technology, this approach helps to shorten duration of the timing estimation, and therefore reduces start-up overhead. Further, prior to correlation, interpolation is performed on the received frame to estimate integer as well as fractional timing offsets. The integer estimate is referred to as the symbol-timing offset ($\Delta$) and the fractional estimate is referred to as the sample timing offset ($\epsilon$). Averaging the ($\Delta+\epsilon$) over multiple DMT frames during start-up provides a very accurate estimate of the timing offsets.

After the receiver 135 estimates the timing offsets, it should advance or delay its sampling clock by the same amount to get synchronized with the transmitter 103. This procedure is called timing offset correction. The receiver 135 does correction for symbol timing offset ($\Delta$) in the time-domain through delaying or advancing the symbol clock by an integer number of samples. And compensation for the fractional sample timing offset ($\epsilon$) is done in frequency domain through the delay-rotor property. This delay rotor property refers to a process that uses a circular buffer in which data received first, is the first data sent out of the buffer. In other words, this circular buffer can comprise a first-in, first-out (FIFO) buffer. The buffer can cycle through data with such speed to create enough delay to help synchronize the transmitter and receiver.

The receiver 135 also performs channel estimation so that it can compensate for the effects of the channel, such as a telephone line channel according to one exemplary embodiment. Conventional systems are adapted to perform channel estimation after synchronization. One exemplary embodiment of the present invention provides a novel solution that allows for the simultaneous estimation of timing offsets and the channel response. This exemplary embodiment of the present invention also uses certain carriers as pilot tones, and the transmitter 103 sends known QAM symbols over these pilot tones. At the receiver 135, this information is used to estimate the effects of the channel. This exemplary embodiment of the present invention utilizes one of the optimal sets of pilot tones. Within a total of N subcarriers, the optimum set of L pilot tones is selected. Further details of this exemplary embodiment for synchronizing a transmitter and a receiver can be found in copending and commonly owned U.S. application Ser. No. 10/065,635, filed on Nov. 5, 2002, entitled, "Discrete Multitone Modem Initialization System and Method," the entire contents of which are hereby incorporated by reference.

In the exemplary per-tone frequency domain equalizer 150, noise present in the data signal can be reduced through a novel process of estimating equalizer co-efficients. The per-tone frequency domain equalizer utilizes training signals and an Toeplitz matrix to arrive at the equalizer coefficients. Details of the per-tone frequency domain equalizer 150 will be discussed in further detail below. The output of the per-tone frequency domain equalizer 150 is then fed into the bit-unloading element 155.

Figure 2:
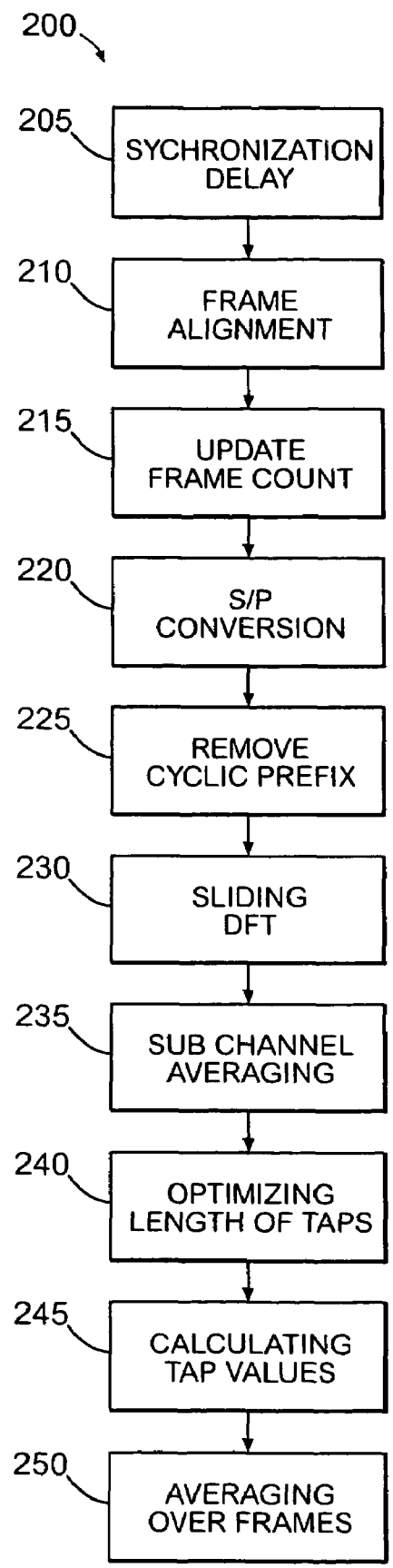
FIG. 2 is a flow chart illustrating steps for estimating per tone FEQ tap weights according to one exemplary embodiment of the present invention.

Referring now to FIG. 2, this figure illustrates an exemplary method 200 for estimating the per-tone frequency domain equalizers. FIG. 2 generally corresponds with the functionality of the receiver 135 illustrated in FIG. 1.

Step 205 is the first stage in the exemplary method 200 for estimating per-tone frequency equalizer coefficients. In step 205, a synchronization delay is added to the data signal. This delay is a period based on timing acquisition and channel estimation. Further details of step 205 are found in copending and commonly owned U.S. application Ser. No. 10/065,635, filed on Nov. 5, 2002, entitled, "Discrete Multitone Modem Initialization System and Method," the entire contents of which are hereby incorporated by reference.

In step 210, frames are aligned by timing offset correction. With this step, both the transmitter 103 and receiver 135 are synchronized. In this step, the Maximum Likelihood (ML) estimation is calculated by using a whole DMT frame having a frame length of N+LP. In this ML calculation, a whole DMT frame having a frame length of N+LP is compared to or correlated with a pre-stored frame of the same size in the receiver 135.

In step 215, when the initialization or synchronization phase of steps 205 and 210 are over, the frame counter is reset. The resetting of the frame counter at the end of synchronization allows counting of actual data frames.

In step 220, the data samples are received as a data stream and are transformed into multiple parallel streams through serial to parallel conversion to facilitate the DFT operation in step 230, discussed below.

In step 225, the Cyclic prefix is removed with the CP removal element 140. In step 230, a sliding Discrete Fourier Transform (DFT) of the data signal is made. It is actually implemented though Fast Fourier Transform to obtain sample values of the subcarriers.

Next, in step 235, the sub-channel or sub-carriers from the output of the sliding DFT are averaged together. Specifically, the subchannels can be averaged together using Equation (EQN.) VI described in further detail below. Step 235 can be referred to as noise averaging and is used to further improve the accuracy of the FEQ tap values estimation that form the elements of the N Log N matrix as discussed in further detail below. Further details of EQN. VI and the noise averaging technique is described in commonly owned and copending U.S. application Ser. No. 10/605,933, filed on Mar. 4, 2004, and entitled, "Method and Apparatus for Noise Reduction by Spectral and Subcarrier Averaging," the entire contents of which are hereby incorporated by reference.

In step 240, the length of taps are optimized to overcome large CIR situations. Optimization in this step means that equalizer length under a given set of signal-to-noise-ration (SNR) conditions is minimized. This translates into shorter equations to solve or using smaller numbers, and therefore, this optimization of the equalizer length increases processing speed of digital signal processors (DSPs). The per tone equalizer length can be individually optimized by equalizing each row in the Toeplitz matrix through the use of pilot or training signals. In other words, every element of each row of the Toeplitz matrix can be multiplied by the pilot signal.

This optimization also includes using a receiver equalization scheme comprising a T-tap time domain equalizer (TEQ) to shorten the length of the CIR and a frequency domain equalizer (FEQ) comprising N 1-tap filters that are utilized to correct for signal phase rotation and signal amplitude attenuation. The TEQ and FEQ are present in the FEQ block 150 in FIG. 1. With step 240, singularity errors in calculating the FEQ tap values can be avoided.

In step 245, the tap values that are estimated by the noise averaging technique in step 235 using EQN. VI discussed below can then be calculated by using matrix inversion with a Toeplitz matrix (See EQN. V described below). The Toeplitz matrix of EQN. V and its matrix elements that are derived from noise averaging techniques may be implemented as an algorithm that can be executed by a digital signal processor.

Next, in step 250, the data that is demodulated with the tap values derived in step 245 is averaged over respective frames and subcarriers using EQN. IX described below. This averaging of frames demodulated with the Toeplitz matrix reduces or removes thermal noise and thus improves the signal to noise ratio.

Referring now to FIG. 3, this figure illustrates a table 300 of data rate comparisons between conventional equalizer schemes. The first column 305 of table 300 lists the loop length of a digital subscriber line in kilometers (km). The second column 310 describes the data rate for the conventional per-tone equalization (PTE) scheme. The third column 315 lists data rates for the conventional unit energy constrain (UEC) equalizer scheme. The fourth column 320 lists the data rates for the time domain equalization with filter bank (TEQ-FB) equalizer scheme.

The fifth column 325 lists the data rates for the minimum Means square error (MMSE) equalizer scheme. The sixth column 330 lists the data rates for the maximized signal-to-noise (Max SNR) constrain equalizer scheme. And the seventh column 335 of table 300 lists the maximized bit rate (Max BR) constrains equalizer scheme data rates.

Figure 4:
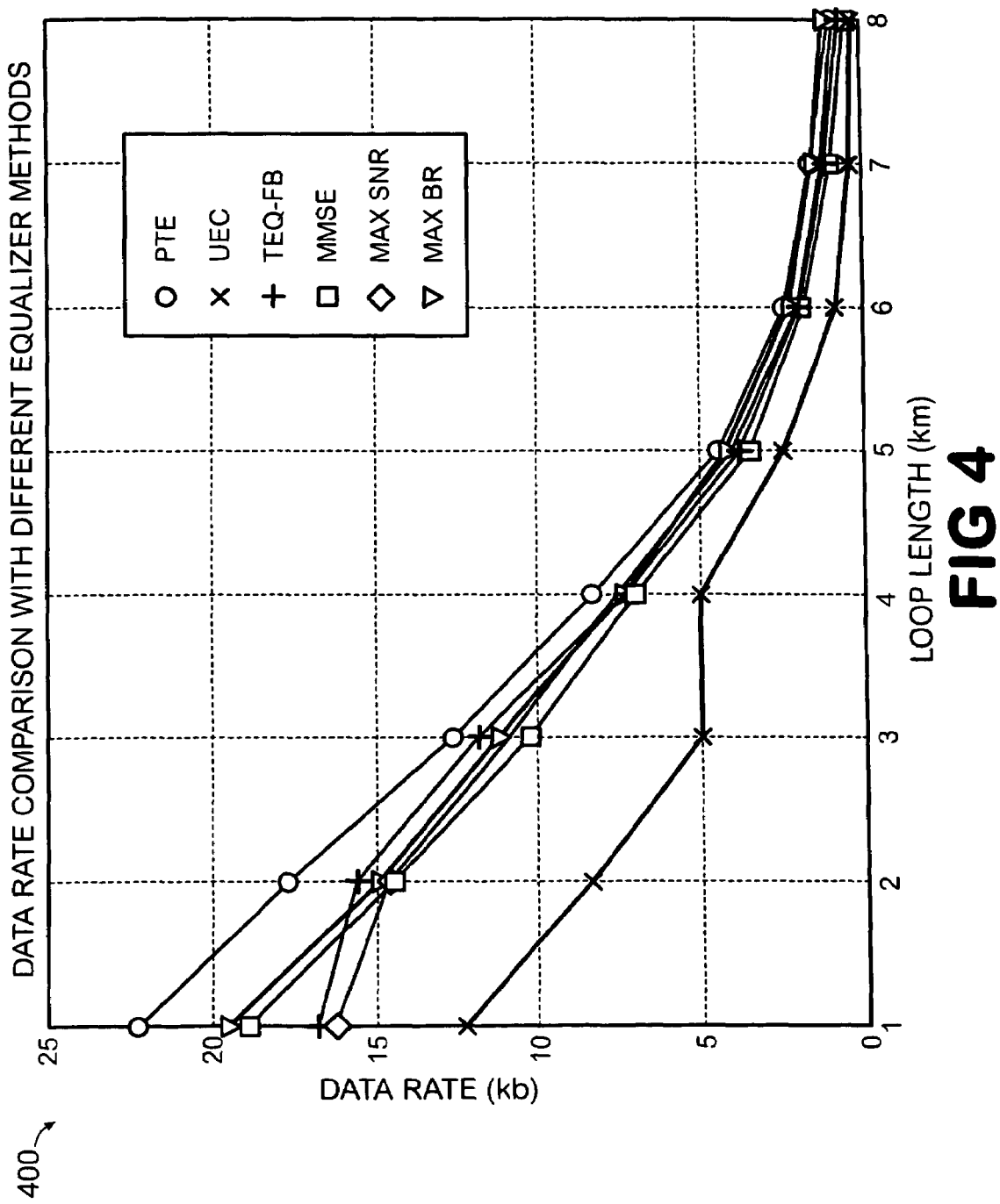
FIG. 4 is a graph illustrating a data rate comparison with the different equalizer schemes illustrated in FIG. 3.

Referring now to FIG. 4, this figure illustrates a graph 400 that plots the data contained in table 300. This graph 400 charts the data rate along the y-axis in kilobytes in the loop length in kilometers along the x-axis.

Exemplary system performance is depicted in FIGS. 3 and 4 utilizing various equalizer schemes. Existing conventional modems are unable to communicate at extended loop lengths. It can be seen from the figures that the equalizer performance can be improved by reducing the noise for the PTE (per-tone equalization)—the current invention. The data rates are vastly different for different equalizer schemes since ISI and thermal noise are predominant for long loops. In the figures, UEC means unit energy constraint; TEQ-FB means time domain equalization with filter bank; MMSE means per-tone equalization using MMSE method; Max SNR means maximize SNR constraint for single path and Max BR means maximize bit rate constraint for single path. Comparing with the UEC scheme, for loop lengths of 8 Kilometers, the current invention can increase the data rate from 0.27 Mb/s to 1.2 Mb/s.

Referring now to FIG. 5, this figure illustrates a table 500 of a data rate comparison with a different number of periodic training symbols according to one exemplary embodiment of the present invention. The first column 505 lists the number of frames while the second column 510 lists the data rate for a distance of eight kilometers.

Figure 6:
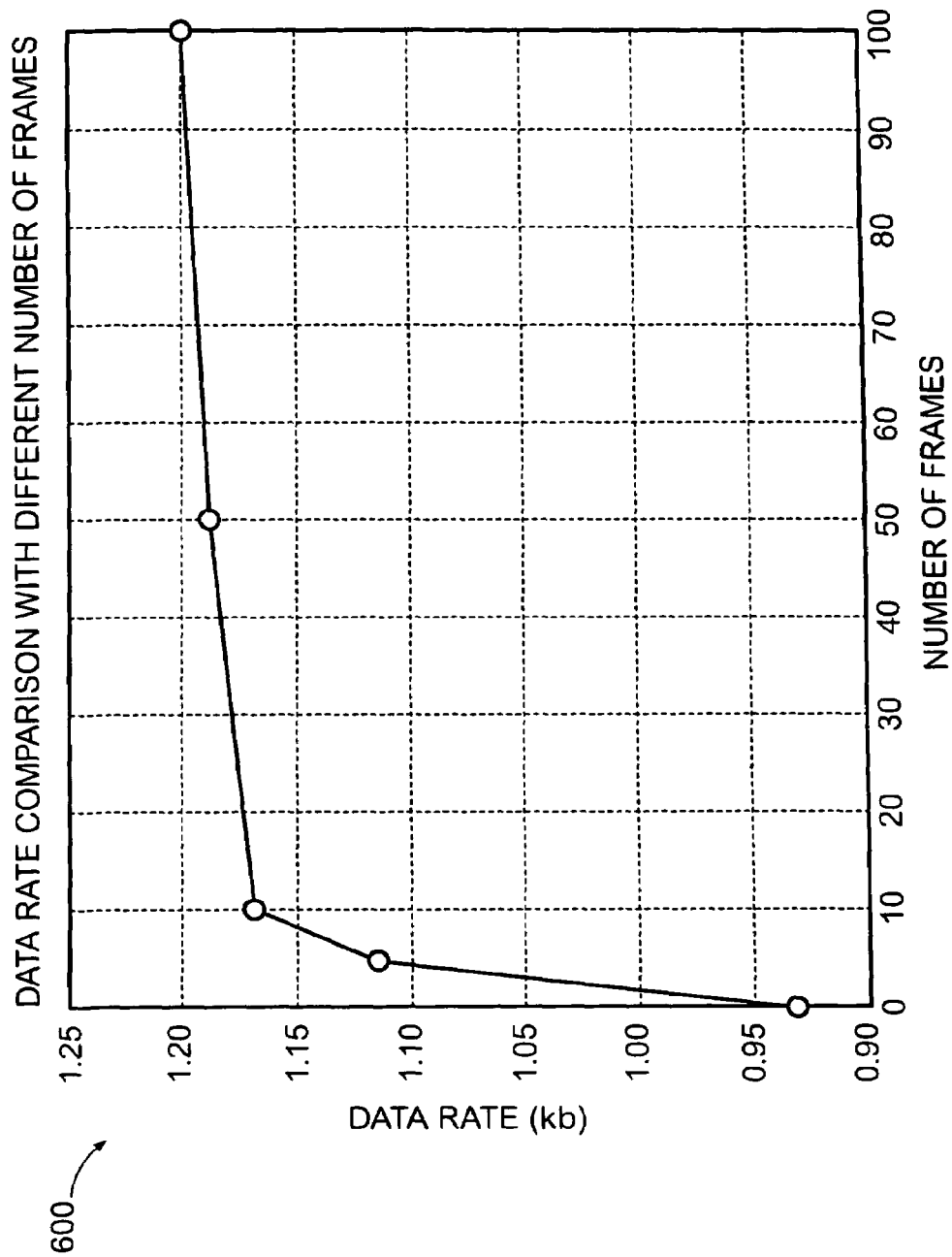
FIG. 6 is a graph illustrating a data rate comparison of a different number of periodic training symbols according to one exemplary embodiment of the present invention.
Figure 7:
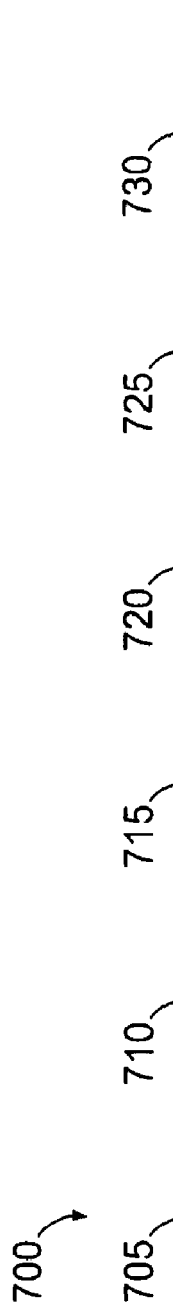
FIG. 7 is a table of a data rate comparison with and without noise reduction according to one exemplary embodiment of the present invention.

Referring briefly to FIG. 6, this figure illustrates a graph 600 that plots the data rate comparison chart 500 illustrated in FIG. 5. Referring now to FIG. 7, this figure illustrates a table 700 of a data rate comparison with and without noise reduction according to one exemplary embodiment of the present invention. In table 700, the first column 705 lists the loop length in kilometers.

The second column 710 of table 700 lists the loop length in thousands of feet. The third column 715 lists the loop length in miles. The fourth column 720 of table 700 lists the per-tone equalization (PTE) for a hundred frames of data in megabits per second. The fifth column 725 of table 700 lists the PTE of data in single frames in megabits per second. And lastly, the sixth column 730 of the table 700 lists the PTE of the data for one tap in megabits per second.

Referring now to FIG. 8, this figure illustrates a graph 800 of the data contained in table 700 that is a comparison of data rates with and without noise reduction. Referring now to FIG. 9, this figure is a graph 900 that compares data rates between the 512 and 2048 sub-channels.

In conclusion, FIGS. 5 and 6 illustrate the data rate comparison with different number of frames for loop lengths of 8 kilometer (26.24 kilo feet~5 mile). As the number of frames increases, the accuracy of PTE equalizer is improved. FIGS. 7 and 8 show a PTE comparison with and without noise reduction over various loop lengths. For loop length of 8 kilometer without noise reduction the data rates is 0.893 Mb/s. In contrast with noise reduction technique, the throughput is 1.2 Mb/s.

FIG. 9 illustrates that with the proposed per tone equalizer of one exemplary embodiment of the present invention, higher data rates can be achieved in both short and long loops.

Mathematical Description of an Exemplary System

A system equation corresponding to a multi-tone based modem can be written as:

$$y = Hx + n \quad \text{(EQN. I)}$$

Where x is a complex symbol to be transmitted, y is the demodulated output, H is the channel impulse response and n is the additive channel noise. For each of the used tones, MMSE-FEQs were found by minimizing the cost function:

$$\min J(w_i) = \min |z_i - x_i|^2 \quad \text{(EQN. II)}$$

Where $w_i$ is the tap vector for each tone i, $z_i$ is the output after frequency-domain equalization. With different constrains, the data rate were different after equalizations.

The standard receiver with TEQ is based on the following operation:

$$\begin{bmatrix} Z_1^k \\ \cdots \\ \cdots \\ \cdots \\ \cdots \\ Z_N^k \end{bmatrix} = \begin{bmatrix} D_1 & 0 & \cdots & \cdots \\ \cdots & \cdots & \cdots & \cdots \\ \cdots & \cdots & \cdots & \cdots \\ \cdots & \cdots & 0 & D_N \end{bmatrix} \cdot F_N \cdot (Y \cdot w) \quad \text{(EQN. III)}$$

where $Z_i^k$ is the final output after frequency domain equalization, $F_N$ is an N by N FFT-matrix, D is the complex 1-tap FEQ for tone i, and k is the time index of the symbol. For per-tone FEQ, the TEQ-operations is transferred to the frequency domain as follows for a single tone i:

$$Z_i^k = D_i F_i^N \cdot (Y \cdot w) = (F_i^N \cdot Y) \cdot (w \cdot D_i) = (F_i^N \cdot Y) \cdot w_i^T \quad \text{(EQN. IV)}$$

Where $w_i^T = (w \cdot D_i)$ is the T-tap FEQ and Y is the (N×T) Toeplitz matrix of received signal samples which contains exactly the same received signal samples a vector y described in EQN. I. Solving for Y and where per-tone equalization coefficients for each group can be combined, a vector convergence and optimized result is achieved as follows:

$$Y = \begin{bmatrix} y_{k \cdot s+v+1} & y_{k \cdot s+v} & \cdots & y_{k \cdot s+v-T+2} \\ y_{k \cdot s+v+2} & y_{k \cdot s+v+1} & \cdots & y_{k \cdot s+v-T+3} \\ \vdots & \vdots & \ddots & \vdots \\ y_{(k+1) \cdot s} & y_{(k+1) \cdot s-1} & \cdots & y_{k \cdot s+v-T+1} \end{bmatrix} \quad \text{(EQN. V)}$$

Where s=N+v and is the length of a symbol including prefix, N is the symbol size expressed in samples; k is the time index; v denotes the length of cyclic prefix. The Toeplitz matrix of EQN. V listed above can be implemented as an algorithm executed by a digital signal processor.

One exemplary and inventive approach is described in step 235 in FIG. 2 illustrated above in which periodic training signals are used to estimate the per-tone FEQs using an averaging technique to remove the noise for each sub-channel:

$$y_i = \frac{1}{N_P} \sum_{j=1}^{N_P} y_i^j \quad \text{(EQN. VI)}$$

where y is demodulated output, and N is a symbol size expressed in samples. Further details of EQN. VI and the noise averaging technique is described in commonly owned and copending U.S. application Ser. No. 10/605,933, filed on Mar. 4, 2004, and entitled, "Method and Apparatus for Noise Reduction by Spectral and Subcarrier Averaging," the entire contents of which are hereby incorporated by reference.

Theoretically, the channel distortion can be compensated with a filter that is the inverse of the channel. The FEQ equalizer is estimated as follows:

$$F_r = \frac{x_r y_r + x_i y_i}{y_r^2 + y_i^2} \quad \text{(EQN. VII)}$$

$$F_i = \frac{x_i y_r - x_r y_i}{y_r^2 + y_i^2} \quad \text{(EQN. VIII)}$$

Where the sub index i indicates the imaginary part and r indicates the real part of the FEQ.

Further, group techniques can be used to remove the singularity if $r^2 = y_r^2 + y_i^2$ is too small. This is especially true for long loops.

So, the per-tone FEQ can be represented as:

$$F_i = \frac{1}{M_P} \sum_{j=1}^{M_P} F_i^j \quad \text{(EQN. IX)}$$

where M is the number of tones according to the sub-channels, and $F_N$ is an N by N FFT-matrix.

As described, one exemplary embodiment of the present invention discloses a new useful and non-obvious solution to increase data rate for DMT/FMT based modems through noise reduction techniques and the per-tone FEQ.

It will thus be seen that the objects set forth above, and those made apparent from the foregoing description, are efficiently attained. Since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed is:

1. A method for initializing and adapting a communications receiver for increased data throughput, comprising the steps of:
   receiving frames of data;
   estimating values of taps of a frequency domain equalizer (FEQ) with an averaging technique that removes noise and improves performance;
   minimizing lengths of the taps using the data;
   calculating values of the taps with the estimated values through an N Log N matrix inversion solution using the data; and
   generating an average of the frames of data;
   wherein generating an average of the frames of data comprises:

$$F_i = \frac{1}{M_p} \sum_{j=1}^{M_p} F_i^j$$

where M is the number of tones according to the subchannels, and $F_N$ is an N Log N inversion solution FFT-matrix.

2. A method for initializing and adapting a communications receiver for increased data throughput, comprising the steps of:
   receiving frames of data;
   estimating values of taps of a frequency domain equalizer (FEQ) with an averaging technique that removes noise and improves performance;
   minimizing lengths of the taps using the data;
   calculating values of the taps with the estimated values through an N Log N matrix inversion solution using the data; and
   generating an average of the frames of data;
   wherein estimating values of the taps with an averaging technique further comprises estimating values of taps by using an equation comprising:

$$y_i = \frac{1}{N_p} \sum_{j=1}^{N_p} y_i^j$$

where y is demodulated output, and N is a symbol size expressed in samples.

3. The method of claim 1, wherein minimizing lengths of taps further comprises multiplying each row of an N by N matrix with the pilot signal, where N is an integer.

4. The method of claim 1, wherein calculating values of the taps with an N Log N matrix inversion solution and the data further comprises calculating values of the taps with a Toeplitz matrix having a structure of:

$$Y = \begin{bmatrix} y_{k \cdot s+v+1} & y_{k \cdot s+v} & \cdots & y_{k \cdot s+v-T+2} \\ y_{k \cdot s+v+2} & y_{k \cdot s+v+1} & \cdots & y_{k \cdot s+v-T+3} \\ \vdots & \vdots & \ldots & \vdots \\ y_{(k+1) \cdot s} & y_{(k+1) \cdot s-1} & \cdots & y_{k \cdot s+v-T+1} \end{bmatrix}$$

where Y is a (N×T) Toeplitz matrix of received signal samples, y is demodulated output, s=N+v and is a length of a symbol including prefix, N is a symbol size expressed in samples, k is a time index, and v is a length of a cyclic prefix.

5. The method of claim 1, further comprising storing a frame of data in the receiver comprising one or more symbols.

6. The method of claim 1, further comprising applying a synchronization delay to the signal.

7. The method of claim 1, further comprising aligning received frames of data based on the stored frame.

8. The method of claim 1, further comprising resetting a frame counter.

9. The method of claim 1, further comprising:
   converting the training signal into parallel signals; and
   removing a cyclic prefix from the parallel signals.

10. The method of claim 1, further comprising transforming received parallel signals using a sliding discrete Fourier transform.

11. A communications receiver having computer-executable instructions for performing the steps recited in claim 1.

12. A communications receiver comprising:
   a T-tap time domain equalizer (TEQ) for shortening lengths of a channel input response of a received signal;
   a frequency domain equalizer (FEQ) comprising N 1-tap filters for correcting a phase rotation and an amplitude attenuation of the received signal;
   a processing unit;
   a memory storage device; and
   a program stored in the memory storage device for providing instructions to the processing unit; the processing unit responsive to the instructions of the program, operable for
   estimating values of taps of a frequency domain equalizer (FEQ) with an averaging technique that removes noise, wherein estimating values of taps comprises using an equation comprising:

$$y_i = \frac{1}{N_p} \sum_{j=1}^{N_p} y_i^j$$

where y is demodulated output, and N is a symbol size expressed in samples;
   minimizing lengths of the tap filters for the frequency domain equalizer (FEQ); and
   calculating values of the taps with the estimated values and an N Log N matrix inversion solution.

13. The receiver of claim 12, wherein the processing unit is further operable for generating an average of received frames of data.

14. The receiver of claim 12, wherein calculating values of the taps with an N Log N matrix inversion solution and the data further comprises calculating values of the taps with a Toeplitz matrix having a structure of:

$$Y = \begin{bmatrix} y_{k \cdot s+v+1} & y_{k \cdot s+v} & \cdots & y_{k \cdot s+v-T+2} \\ y_{k \cdot s+v+2} & y_{k \cdot s+v+1} & \cdots & y_{k \cdot s+v-T+3} \\ \vdots & \vdots & \cdots & \vdots \\ y_{(k+1) \cdot s} & y_{(k+1) \cdot s-1} & \cdots & y_{k \cdot s+v-T+1} \end{bmatrix}$$

where Y is a (N×T) Toeplitz matrix of received signal samples, s=N+v and is a length of a symbol including prefix, N is a symbol size expressed in samples, k is a time index, and v is a length of a cyclic prefix.

\* \* \* \* \*